US 7,602,626 B2

(12) United States Patent
Iwata et al.

(10) Patent No.: US 7,602,626 B2
(45) Date of Patent: Oct. 13, 2009

(54) POWER CONVERSION APPARATUS

(75) Inventors: Akihiko Iwata, Tokyo (JP); Makoto Seto, Tokyo (JP); Masaki Yamada, Tokyo (JP); Shigeki Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 259 days.

(21) Appl. No.: 11/816,029

(22) PCT Filed: Feb. 21, 2006

(86) PCT No.: PCT/JP2006/303000

§ 371 (c)(1),
(2), (4) Date: Aug. 10, 2007

(87) PCT Pub. No.: WO2006/090674

PCT Pub. Date: Aug. 31, 2006

(65) Prior Publication Data

US 2009/0015071 A1    Jan. 15, 2009

(30) Foreign Application Priority Data

Feb. 25, 2005    (JP) .............................. 2005-050697

(51) Int. Cl.
*H02M 7/00* (2006.01)
(52) U.S. Cl. ........................................ 363/71; 363/132
(58) Field of Classification Search ............... 363/65, 363/71, 98, 132
See application file for complete search history.

(56) References Cited

U.S. PATENT DOCUMENTS

| 6,005,788 | A  | * | 12/1999 | Lipo et al. ..................... 363/71 |
| 6,320,767 | B1 | * | 11/2001 | Shimoura et al. ............. 363/65 |
| 7,485,987 | B2 | * | 2/2009  | Mori et al. ..................... 307/63 |
| 2007/0147098 | A1 | * | 6/2007 | Mori et al. ..................... 363/71 |
| 2008/0192519 | A1 | * | 8/2008 | Iwata et al. ................... 363/71 |

FOREIGN PATENT DOCUMENTS

| JP | 2000-228883 | 8/2000 |
| JP | 2003-219659 | 7/2003 |

OTHER PUBLICATIONS

Mabuchi, M. et al.; "Development of KP40F Solar Power Conditioner", *Omron Technics*, vol. 42, No. 2, Serial No. 142, pp. 146-151 (2002).

* cited by examiner

*Primary Examiner*—Jessica Han
(74) *Attorney, Agent, or Firm*—Leydig, Voit & Mayer, Ltd.

(57) ABSTRACT

In a power conversion apparatus that boosts a solar light voltage, converts it to AC and supplies AC power to a load or system, a second inverter is connected in series to one of two terminals on the AC side of a first inverter that uses, as its DC source, a DC voltage boosted from a solar light voltage by a chopper circuit. A third inverter is connected in series to the other terminal. Then, output voltages of the second and third inverters are controlled to be equal, and an output voltage is provided by using the sum of the generated voltages of the first, second, and third inverters. Thus, a mid-point potential of the DC power source is made equivalent to an intermediate potential of the output voltage of the power conversion apparatus, that is, the mid-point potential (ground potential) of a system.

10 Claims, 4 Drawing Sheets

POWER CONVERSION APPARATUS

TECHNICAL FIELD

The present invention relates to a power conversion apparatus that converts DC power to AC power, and particularly to a power conversion apparatus used for a power conditioner or the like that links a decentralized power source to a system.

BACKGROUND ART

In a conventional power conditioner, for example, as seen in a solar power conditioner, the voltage from a decentralized power source that is a solar battery is boosted by using a chopper, and a PWM-controlled inverter is inserted onto the subsequent stage, thus generating an output AC voltage.

A basic operation of such a conventional power conditioner will be described hereinafter. DC power outputted from the solar battery drives an internal control power source of the power conditioner and thus enables an internal circuit to operate. The internal circuit has a chopper circuit and an inverter unit. The chopper circuit boosts the voltage of the solar battery to a voltage that is required for linking to the system. The inverter unit includes four switches and carries out PWM switching to form an output current having a phase synchronous with the system voltage. A strip-like waveform is outputted in this manner, and the time ratio for output is changed to control the average voltage of the output. The outputted voltage is averaged by a smoothing filter provided on the output side, and AC power is outputted to the system (see, for example, non-patent reference 1).

Non-patent reference 1: "Development of Solar Power Conditioner Type KP40F", OMRON TECHNICS, Vol. 42, No. 2 (Serial No. 142) 2002

DISCLOSURE OF THE INVENTION

Problems that the Invention is to Solve

In the power conditioner which links a solar light voltage to the system, the solar panel that generates solar light has a large stray capacitance with respect to the ground. As the electric potential of the solar panel fluctuates, a large charging current flows to the stray capacitance. Therefore, in the conventional power conditioner, the inverter is always operated at the two levels of both electrodes in order to restrain fluctuation in the electric potential of the solar panel, and the time ratio of the positive and negative voltages is changed to control the average voltage of output, which is then outputted. Therefore, switching loss increases and there is a problem that the overall efficiency of the power conditioner is lowered.

This invention has been made in order to solve the above problems. It is an object of the invention to enable restraining fluctuation in the potential on the DC power source side and improve conversion efficiency in a power conversion apparatus that converts power from a DC power source such as solar light to AC and outputs AC to a system and load.

Means for Solve the Problems

In a power conversion apparatus according to the invention, AC sides of plural single-phase inverters that convert DC power of DC power sources to AC power are connected in series, and an output voltage is controlled by using the sum of generated voltages from a predetermined combination selected from the plural single-phase inverters. The plural single-phase inverters includes a first inverter that uses, as its input, a first DC power source having the highest voltage among the DC power sources, one or more second inverters) connected to a first terminal on the AC side of the first inverter, and one or more third inverters) connected to a second terminal on the AC side of the first inverter. Then, a total output voltage of the second inverters) is substantially equal to a total output voltage of the third inverter(s).

ADVANTAGE OF THE INVENTION

In the power conversion apparatus according to the invention, the total output voltage of the inverter connected to the first terminal side on the AC side of the first inverter, which uses the first DC power source having the highest voltage as its input, and the total output voltage of the inverter connected to the second terminal side on the AC side are substantially equal. Therefore, the mid-point potential of the first DC power source can be made substantially equal to the intermediate potential of the output voltage of the power conversion apparatus. Thus, fluctuation in the electric potential of the DC bus of the first inverter can be restrained without increasing the loss, and a power conversion apparatus with high reliability and efficiency can be provided.

BEST MODE FOR CARRYING OUT THE INVENTION

Embodiment 1

Hereinafter, a power conversion apparatus (hereinafter referred to as power conditioner) according to Embodiment 1 of the invention will be described with reference to the drawings.

Figure 1:
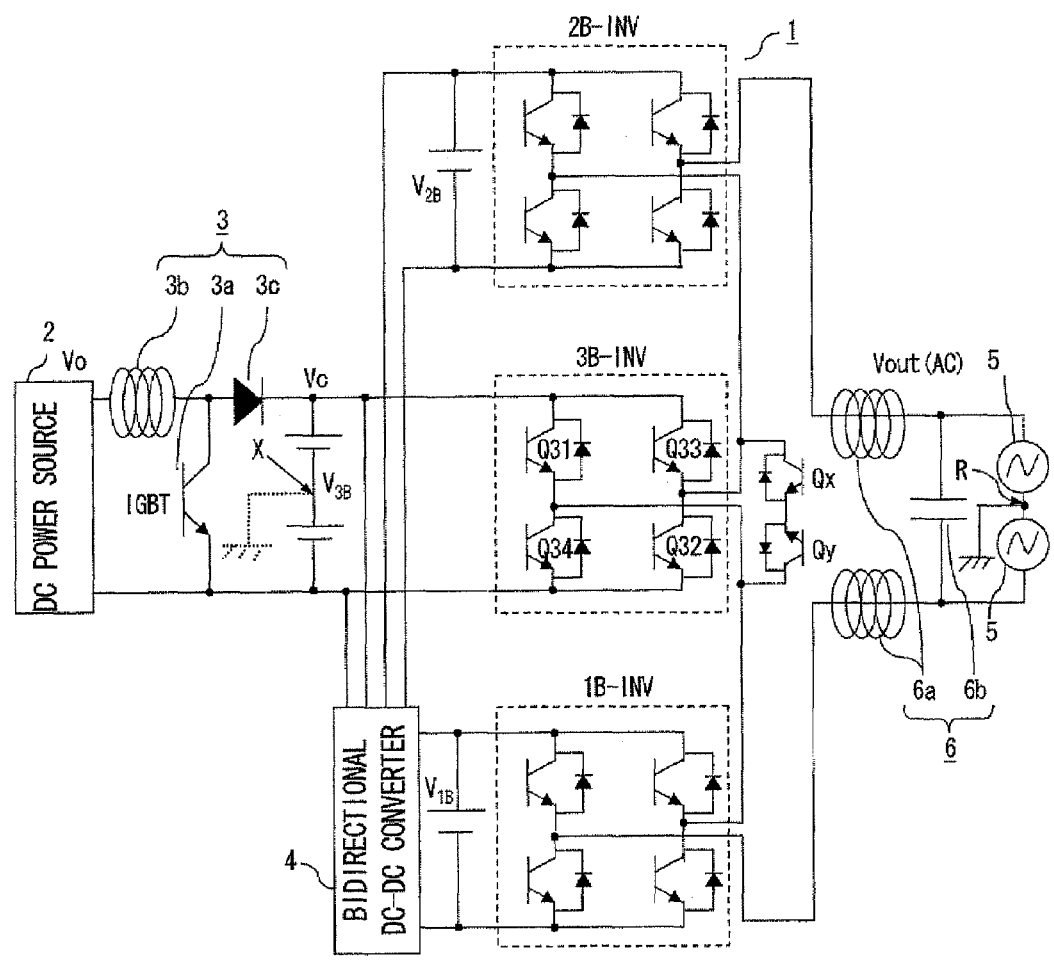
FIG. 1 is a schematic configuration view showing a power conditioner according to Embodiment 1 of the invention.

FIG. 1 is a schematic configuration view showing a power conditioner according to Embodiment 1 of the invention. As shown in FIG. 1, AC sides of plural (in this case, three) single-phase inverters 2B-INV, 3B-INV and 1B-INV are connected in series to form an inverter unit 1, which is a single-phase multiple converter. Each of the single-phase inverters 2B-INV, 3B-INV and 1B-INV includes plural self-turn-off semiconductor switching devices such as IGBTs with diodes connected in inverse-parallel. The single-phase inverter (second inverter) 1B-INV is connected to one terminal on the AC side of the single-phase inverter (first inverter) 3B-INV, which uses a first DC power source $V_{3B}$ as its input, and the single-phase inverter (third inverter) 2B-INV is connected to the other terminal. Also, as short-circuit switches that form a short circuit between the two terminals on the AC sides of the first inverter 3B-INV, two self-turn-off semiconductor switching devices Qx and Qy such as IGBTs, each of which having diodes connected in inverse-parallel, are connected parallel to the first inverter 3B-INV.

Also, a chopper circuit 3 as a booster circuit including a switching device (hereinafter referred to as switch) 3a such as IGBT, reactor 3b and a diode 3c is installed on a stage subsequent to a DC power source 2 based on solar light as a second DC power source. The chopper circuit 3 boosts a DC voltage $V_O$ acquired at the DC power source 2 and thus provides a voltage (potential $V_C$) charging a smoothing capacitor, which serves as first DC power source $V_{3B}$.

The single-phase inverters 2B-INV, 3B-INV and 1B-INV convert DC power of the DC power sources $V_{2B}$, $V_{3B}$ and $V_{1B}$ to AC power and output it. The DC power sources of their inputs are connected to each other via a bidirectional DC-DC converter 4. The voltages of the DC power sources $V_{2B}$, $V_{3B}$ and $V_{1B}$ are described as $V_{2B}$, $V_{3B}$ and $V_{1B}$ for convenience.

The voltage of the DC power source $V_{3B}$, which serves as the input of the first inverter 3B-INV, is higher than the voltages of the DC power sources $V_{2B}$ and $V_{1B}$, which serve as the inputs of the other single-phase inverters 2B-INV and 1B-INV. $V_{2B}$, $V_{3B}$ and $V_{1B}$ are controlled to hold a predetermined voltage ratio by the DC-DC converter 4. Here, $V_{1B}=V_{2B} \geqq (2/9) \times V_{3B}$ holds. That is, the voltages of the DC power sources $V_{1B}$ and $V_{2B}$ of the second and third inverters 1B-INV and 2B-INV are equal and the total of these two is equal to or larger than $(4/9) \times V_{3B}$.

These single-phase inverters 2B-INV, 3B-INV and 1B-INV can generate positive, negative and zero voltages as their outputs. The inverter unit 1 outputs a voltage $V_A$ as the sum of these generated voltages combined, by gradational output voltage control operation. This output voltage $V_A$ is smoothed by a smoothing filter 6 including a reactor 6a and a capacitor 6b and an AC voltage $V_{out}$ is supplied to a system 5. It is assumed that the system 5 has its mid-point R grounded by a pole mounted transformer.

Figure 2:
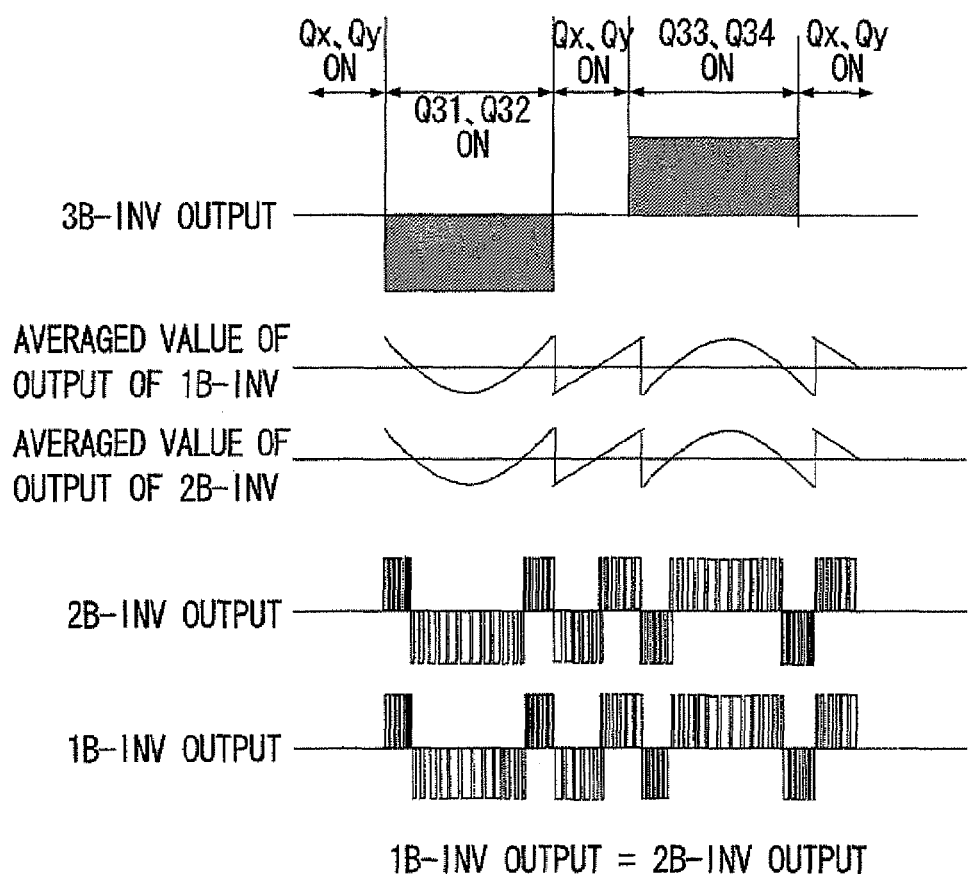
FIG. 2 shows an output voltage waveform of each single-phase inverter according to Embodiment 1 of the invention.

FIG. 2 shows the output voltage waveforms of the single-phase inverters 2B-INV, 3B-INV and 1B-INV. As shown in FIG. 2, the output of the second inverter 1B-INV is equal to the output of the third inverter 2B-INV, and the second and third inverters 1B-INV and 2B-INV are PWM-controlled to produce outputs in order to compensate for the difference between the target output voltage and the output voltage of the first inverter 3B-INV. Practically, they are controlled to flow a current into the system 5. However, in the case where the output reactor 6a is small, the difference between the voltage acquired by averaging the output voltage $V_A$ of the inverter unit 1 and the system voltage is small, and these can be considered almost the same.

As the single-phase inverters 2B-INV, 3B-INV and 1B-INV operate as described above, the mid-point X of the DC power source $V_{3B}$ of the first inverter 3B-INV is equal to the intermediate potential of the output voltage $V_{out}$ of the power conditioner during the period when switching devices Q31 and Q32 of the first inverter 3B-INV are on and during the period when its switching devices Q33 and Q34 are on, that is, during the period when the first inverter 3B-INV is outputting either positive or negative voltage. Since the output voltage $V_{out}$ is substantially the same as the system voltage, the mid-point X of the DC power source $V_{3B}$ has a potential equal to the ground potential, which is the intermediate potential (potential at the mid-point R) of the system 5, during the above periods.

During the period when the output voltage of the first inverter 3B-INV is zero, the semiconductor switches Qx and Qy that form a short circuit between the two terminals on the AC side of the first inverter 3B-INV are turned on into continuity and all the semiconductor switches Q31 to 034 of the first inverter 3B-INV are turned off. If one of the semiconductor switches Q31 to Q34 is turned on into continuity, the potential of the DC power source $V_{3B}$ is fluctuated by the fluctuation of the system voltage. However, if all the semiconductor switches Q31 to Q34 are turned off as described above to shut off the DC power source $V_{3B}$ from the system 5 (AC output power line), the potential of the DC power source $V_{3B}$ will not be affected by the fluctuation of the system voltage. Thus, the potential at the mid-point X of the DC power source $V_{3B}$ can keep the previous potential, that is, the ground potential.

In this manner, the potential at the mid-point X of the DC power source $V_{3B}$ is constantly equal to the ground potential and each of the positive and negative electrode sides of the DC power source $V_{3B}$ can maintain a constant DC potential from the ground potential.

As described above, the solar panel (DC power source 2) that generates solar light has a large stray capacitance with respect to the ground. When the potential of the solar panel 2 fluctuates, a large charging current flows to this stray capacitance. However, since the mid-point potential of the DC power source $V_{3B}$ generated by boosting the solar light voltage $V_O$ can be fixed to the ground potential, the fluctuation of the potential of the solar panel 2 can be restrained and also the current flowing to the stray capacitance can be restrained.

In this embodiment, as described above, the AC sides of the single-phase inverter (first inverter) 3B-INV, which uses the DC voltage $V_{3B}$ boosted from the solar light voltage $V_O$ by the chopper circuit 3, as its DC source, and of the other single-phase inverters 2B-INV and 1B-INV are connected in series, and the power conditioner is configured to provide an output voltage by using the sum of the generated voltages of the inverters. Therefore, a higher voltage than the DC voltage $V_{3B}$ boosted by the chopper circuit 3 can be outputted and the efficiency of the power conditioner can be improved. Moreover, since the second inverter 1B-INV is connected to one of the two terminals on the AC side of the first inverter 3B-INV and the third inverter 2B-INV is connected to the other terminal so that the outputs of the second and third inverters 1B-INV and 2B-INV are controlled to be equal, the mid-point potential of the DC power source $V_{3B}$ can be made equal to the intermediate potential of the output voltage $V_{out}$ of the power conditioner. That is, in the case where power is to be supplied to the system 5 with its mid-point grounded, the mid-point potential of the DC power source $V_{3B}$ can be the ground potential, and the fluctuation of the potential of the solar panel 2 can be restrained.

Since the DC power sources $V_{2B}$, $V_{3B}$ and $V_{1B}$ are connected by the DC-DC converter 4 and have their voltages controlled, a desired output voltage can be generated from each single-phase inverter and the above advantage can be achieved efficiently and securely.

Also, the semiconductor switches Qx and Qy are provided, which form a short circuit between the two terminals on the AC side of the first inverter 3B-INV, and during the period when the output voltage of the first inverter 3B-INV is zero, the semiconductor switches Qx and Qy are turned on to bypass the first inverter 3B-INV. Therefore, the fluctuation of the potential of the DC power source $V_{3B}$ of the first inverter 3B-INV is restrained. Moreover, during that period, all the semiconductor switches Q31 to Q34 of the first inverter 3B-INV are turned off to shut off the DC power source $V_{3B}$ from the system 5. Thus, the mid-point potential of the DC power source $V_{3B}$ can be made constantly equal to the ground potential and the fluctuation of the potential of the solar panel 2 can be restrained with high reliability.

In this case, the power conditioner that supplies output power to the system 5 is described. However, also in the case where output power is to be supplied to a load, the mid-point potential of the DC power source $V_{3B}$ can be made equivalent to the intermediate potential of the output voltage $V_{out}$ of the power conditioner, and also the fluctuation of the potential of the DC bus of the first inverter 3B-INV can be restrained.

Also, in this embodiment, it is described that the second and third inverters 1B-INV and 2B-INV connected to both sides of the first inverter 3B-INV have their voltage waveforms controlled accurately by PWM control. However, if $V_{1B}=V_{2B}=(2/9)\times V_{3B}$ is held, PWM control need not be performed.

It is assumed that the voltages of the DC power sources $V_{1B}$ and $V_{2B}$ are equal, but the voltages of the DC power sources $V_{1B}$ and $V_{2B}$ may differ if the outputs of the second and third inverters 1B-INV and 2B-INV are equal. Moreover, the second and third inverters connected to both sides of the first inverter 3B-INV may be plural units of each, as long as the sum of their output voltages is equal on both sides.

Embodiment 2

In the above Embodiment 1, the semiconductor switches Qx and Qy are provided, which form a short circuit between the two terminals on the AC side of the first inverter 3B-INV. However, these semiconductor switches Qx and Qy may be omitted.

In this case, the output voltage waveforms of the single-phase inverters 2B-INV, 3B-INV and 1B-INV are similar to those shown in FIG. 2, and the output of the second inverter 1B-INV and the output of the third inverter 2B-INV are equal. The second and third inverters 1B-INV and 2B-INV are caused to produce outputs in order to compensate for the difference between the target output voltage and the output voltage of the first inverter 3B-INV. Therefore, during the period when the first inverter 3B-INV is outputting either positive or negative voltage, the mid-point X of the DC power source $V_{3B}$ of the first inverter 3B-INV has a potential equal to the intermediate potential of the output voltage $V_{out}$ of the power conditioner.

Then, during the period when the output voltage of the first inverter 3B-INV is zero, the semiconductor switches are switched in such a manner that simultaneous continuity of the semiconductor switches Q31 and Q33 in the first inverter 3B-INV and simultaneous continuity of the semiconductor switches Q32 and Q34 occur alternately. Thus, the mid-point X of the DC power source $V_{3B}$ of the first inverter 3B-INV has, on average, a potential equal to the intermediate potential of the output voltage $V_{out}$ of the power conditioner.

Therefore, in the period when the output voltage of the first inverter 3B-INV is any of positive, negative and zero, the mid-point X of the DC power source $V_{3B}$ has a potential equal to the intermediate potential of the output voltage $V_{out}$ of the power conditioner, and it becomes equal to the ground potential, which is the intermediate potential (potential at the mid-point R) of the system 5. Thus, as in the above Embodiment 1, the fluctuation of the potential of the solar panel 2 can be restrained and also the current flowing to the stray capacitance can be restrained.

Embodiment 3

Next, the power conditioner having the similar circuit configuration shown in FIG. 1 in the above Embodiment 1, with improved efficiency of the chopper circuit 3, will be described hereinafter.

Meanwhile, the maximum output voltage necessary for an AC output of 200 V is approximately 282 V. The output voltage $V_A$ of the inverter unit 1 can be $V_{1B}+V_{2B}+V_{3B}$ at the maximum. Therefore, if $V_{1B}+V_{2B}+V_{3B}$ is approximately 282 V or higher, the power conditioner can provide an AC output of 200 V. $V_{1B}+V_{2B}+V_{3B}$ is larger than $V_{3B}$, which is the voltage boosted by the chopper circuit 3. For example, if the relation between $V_{1B}$, $V_{2B}$ and $V_{3B}$ is 2:2:9, $V_{1B}+V_{2B}+V_{3B}$ is 13/9 times $V_{3B}$. That is, when $V_{3B}$ is about 195 V or higher, $V_{1B}+V_{2B}+V_{3B}$ is 282 V or higher and this is the condition for an AC output.

If the solar light voltage $V_O$ is 195 V or higher, $V_{3B}$ is about 195 V or higher and a predetermined AC output can be provided without the boosting operation by the chopper circuit 3. Therefore, in this embodiment, the IGBT switch 3a is turned on and off until the DC voltage (solar light voltage) $V_O$ acquired at the DC power source 2 reaches a predetermined voltage $V_{m1}$ (195 V), and the voltage is thus boosted to the voltage $V_{m1}$. When the predetermined voltage $V_{m1}$ is exceeded, the IGBT switch 3a is stopped to stop the boosting operation of the chopper circuit 3.

As the solar light voltage $V_O$ increases, the boosting rate is lowered and the efficiency of the chopper circuit 3 improves. However, when the IGBT switch 3a is stopped, the loss is significantly reduced and there is only a continuity loss of the diode 3c. Moreover, as the solar light voltage $V_O$ increases, the current is lowered and the continuity loss in the diode 3c is reduced.

In this embodiment, when the solar light voltage $V_O$ exceeds a predetermined voltage $V_{m1}$ (195 V), the IGBT switch 3a is stopped to stop the boosting operation. Therefore, the power loss due to boosting can be significantly reduced as described above, and a power conditioner with high conversion efficiency can be provided.

Embodiment 4

Figure 3:
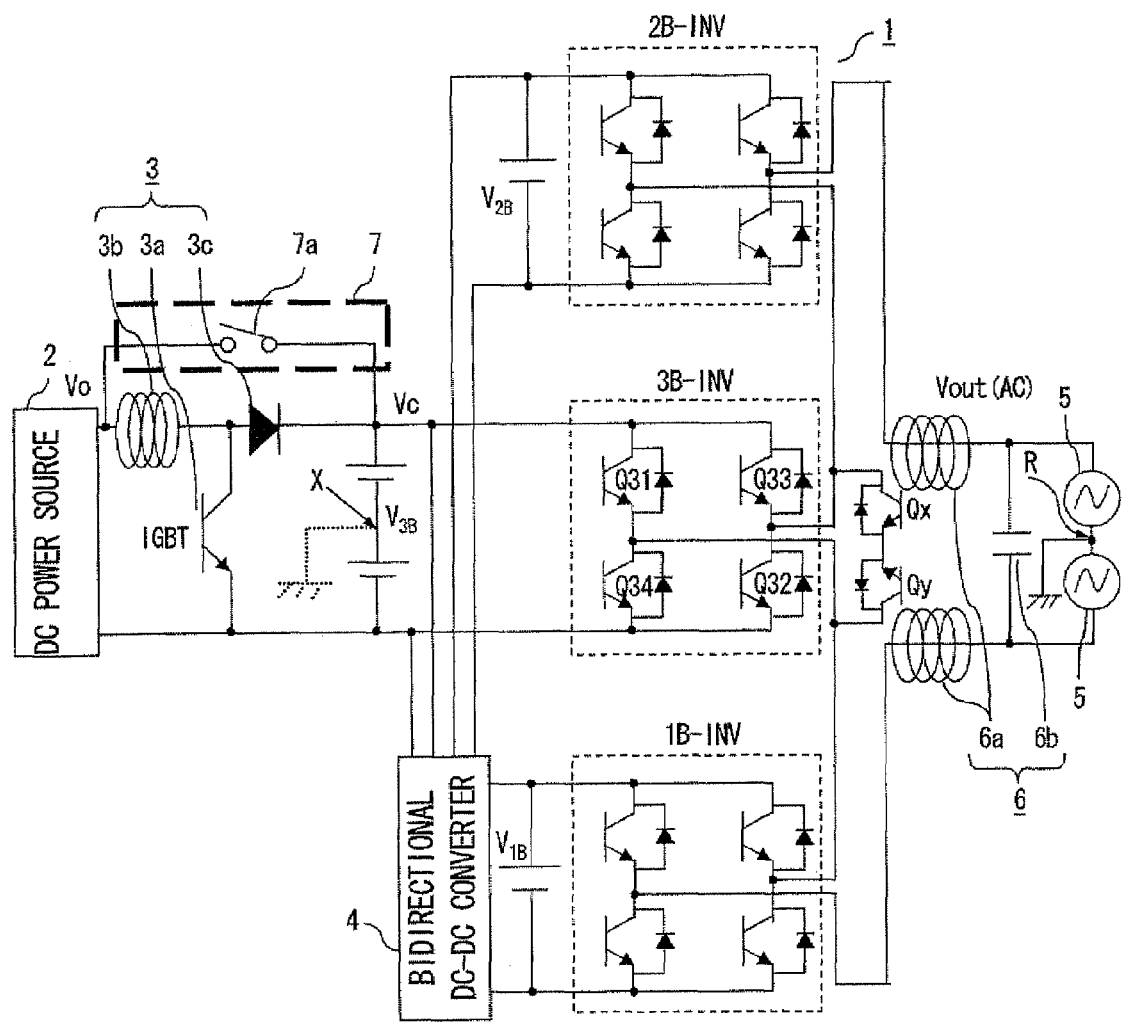
FIG. 3 is a schematic configuration view showing a power conditioner according to Embodiment 4 of the invention.

FIG. 3 is a schematic configuration view showing a power conditioner according to Embodiment 4 of the invention. The power conditioner according to this embodiment is configured by providing a bypass circuit 7 that bypasses the chopper circuit 3 in the power conditioner shown in FIG. 1 of the above Embodiment 1.

As shown in FIG. 3, the chopper circuit 3 boosts a DC voltage $V_O$ acquired at the DC power source 2, and a voltage $V_C$ to charge the smoothing capacitor 4, which serves as the first DC power source, is provided. Also, to bypass the chopper circuit 3 when stopping the boosting, the bypass circuit 7 including, for example, a relay 7a, is connected parallel to the chopper circuit 3.

In the chopper circuit 3, similar to the above Embodiment 3, the IGBT switch 3a is turned on and off until the DC voltage (solar light voltage) $V_O$ acquired at the DC power source 2, which serves as its input, reaches a predetermined voltage $V_{m1}$ (195 V), and it is thus boosted to the voltage $V_{m1}$. During this time, the relay 7a of the bypass circuit 7 is left open. Then, the IGBT switch 3a is stopped when the predetermined voltage $V_{m1}$ is exceeded. At this point, the relay 7a of the bypass circuit 7 is closed and a current is caused to flow to the side of the bypass circuit 7, thus bypassing the reactor 3b and the diode 3c of the chopper circuit 3.

In the range where the solar light voltage $V_O$ is equal to or less than the predetermined voltage $V_{m1}$, the chopper circuit 3 carries out boosting so that the output voltage $V_{3B}$ becomes the predetermined voltage $V_{m1}$. Therefore, as the solar light voltage $V_O$ increases, the boosting rate is lowered and the efficiency of the chopper circuit 3 improves. When the solar light voltage $V_O$ exceeds the predetermined voltage $V_{m1}$, the boosting operation stops and the relay 7a of the bypass circuit 7 is closed to cause a current to flow to the side of the bypass circuit 7. Therefore, there is little loss. Thus, the efficiency of the chopper circuit suddenly increases from the point where the solar light voltage $V_O$ reaches the voltage $V_{m1}$.

The predetermined voltage $V_{m1}$ at which the boosting operation should be stopped may be approximately 195 V or higher. However, a lower voltage enables further reduction in the power loss of the chopper circuit 3. After the boosting operation is stopped, not only the loss can be significantly reduced by the stop of the IGBT switch 3a, but also the continuity loss of the reactor 3b and the diode 3c can be eliminated by bypassing the reactor 3b and the diode 3c in the chopper circuit 3. There is almost no loss in the chopper circuit 3. Therefore, a power conditioner with high conversion efficiency can be provided.

The bypass circuit 7 in the above Embodiment 4 will be described in detail hereinafter, with reference to FIG. 4 to FIG. 6.

The bypass circuit 7 includes the relay 7a and bypasses one or both of the reactor 3b and the diode 3c connected in series in the chopper circuit 3.

Figure 4:
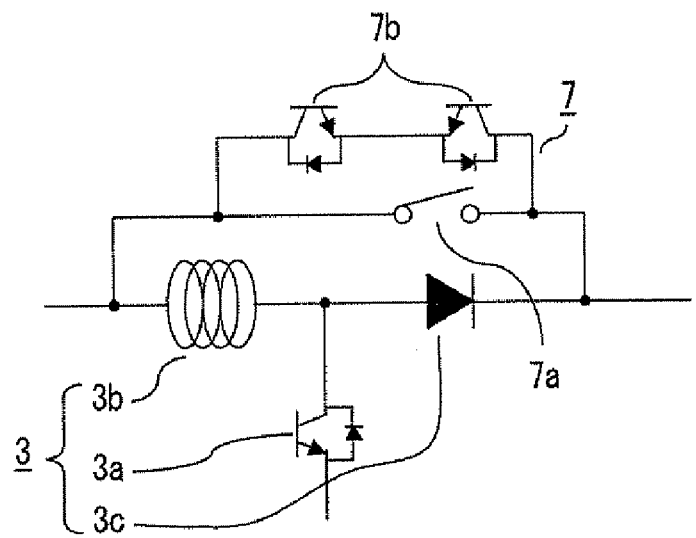
FIG. 4 is a configuration view of a bypass circuit according to Embodiment 4 of the invention.

FIG. 4 shows the bypass circuit 7, in which the relay 7a bypasses the reactor 3b and the diode 3c, as shown in FIG. 3 in the above Embodiment 4. FIG. 5 shows a bypass circuit 7 according to another example, in which the relay 7a bypasses only the diode 3c. FIG. 6 shows a bypass circuit 7 according to second another example, in which the relay 7a bypasses only the reactor 3b.

Also, a self-turn-off semiconductor switch 7b is connected parallel to the relay 7a. Since the relay 7a usually opens with zero current or a low voltage, a DC current is difficult to interrupt. However, it can be easily interrupted when the semiconductor switch 7b is thus provided in parallel. In this case, the semiconductor 7b is turned on at the same time as the relay 7a is opened, and the current is temporarily shifted to the semiconductor switch 7b. Thus, the current flowing through the relay 7a is interrupted, and the semiconductor switch 7b is turned off after that.

In any case, when the solar light voltage $V_O$ exceeds the predetermined voltage $V_{m1}$, the IGBT switch 3a is stopped to stop the boosting operation, and the relay 7a of the bypass circuit 7 is closed to cause the current to flow to the side of the bypass circuit 7.

In the case of FIG. 4, since the reactor 3b and the diode 3c in the chopper circuit 3 are bypassed, the continuity loss of the reactor 3b and the diode 3c can be eliminated and the overall efficiency of the power conditioner increases.

Figure 5:
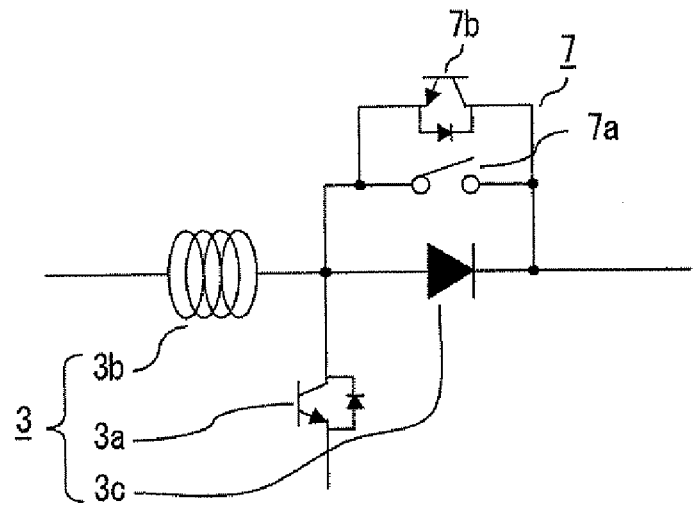
FIG. 5 is a configuration view of another example of a bypass circuit according to Embodiment 4 of the invention.

In the case of FIG. 5, since only the diode 3c in the chopper circuit 3 is bypassed, the continuity loss of the diode 3c can be eliminated and the overall efficiency of the power conditioner increases. In this case, since the reactor 3b is not bypassed, the reactor 3b can be used as a filter.

In FIG. 4 and FIG. 5, since the diode 3c is bypassed, when the DC power source $V_{3B}$ gets higher than the solar light voltage $V_O$, reversal of the current occurs, and additionally, a reverse voltage is applied to the solar panel, which is the DC power source 2. There is a risk of damage to the panel. Therefore, a configuration is made that detects the current flowing through the relay 7a, and that opens the relay 7a when the current becomes a predetermined value or less, in order to switch to the current path via the reactor 3b and the diode 3c. As the relay 7a is thus opened to make the function of the diode 3c effective, the functions of preventing reversal of the current and of protecting the solar panel from the reverse voltage are provided.

When the relay 7a is opened, even if a reverse current has already been generated because of delay in detection, the current can be temporarily shifted to the semiconductor switch 7b and thus can be securely interrupted.

Figure 6:
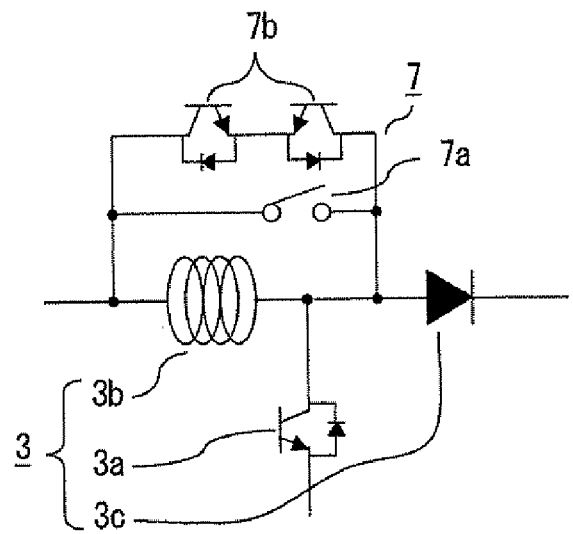
FIG. 6 is a configuration view of second another example of a bypass circuit according to Embodiment 4 of the invention.

In the case of FIG. 6, since only the reactor 3b in the chopper circuit 3 is bypassed, the continuity loss of the reactor 3b can be eliminated and the overall efficiency of the power conditioner increases. Also, since the diode 3c is not bypassed, reversal of the current can be prevented and the solar panel can be protected from the reverse voltage by the diode 3c, and reliability can be easily improved. In this case, the relay 7a can be shut off without having the semiconductor switch 7b provided. However, as the semiconductor switch 7b is provided, the relay 7a can also be shut off when anomaly occurs in the diode 3a.

INDUSTRIAL APPLICABILITY

The invention can be broadly applied to an uninterruptible power supply apparatus that boosts a DC voltage of a decentralized power source such as solar light to a required voltage and then converts it to AC and links it to a system, or an inverter apparatus that supplies AC power after conversion to a load.

The invention claimed is:

1. A power conversion apparatus comprising a plurality of single-phase inverters having respective AC and DC sides and that convert DC power from a plurality of DC power sources to AC power, the plurality of single phase inverters being connected in series, wherein
   the apparatus produces an output voltage that is a sum of generated voltages from a combination of single-phase inverters selected from the plurality of single-phase inverters,
   the plurality of single-phase inverters includes a first inverter having as an input an output voltage produced by a first DC power source producing the highest output voltage of the plurality of DC power sources,
   at least one second inverter is connected to a first terminal on the AC side of the first inverter, and
   at least one third inverter is connected to a second terminal on the AC side of the first inverter, and
   total output voltage of the second inverter is substantially equal to total output voltage of the third inverter.

2. The power conversion apparatus according to claim 1, including a short-circuit switch for short circuiting two terminals on the AC side of the first inverter and connected in parallel with the first inverter, wherein, when the voltage generated by the first inverter is zero, the short-circuit switch is closed to bypass the first inverter.

3. The power conversion apparatus according to claim 2, wherein, when the voltage generated by the first inverter is zero, the short-circuit switch is closed and switching state of the first inverter is controlled so that the first DC power source and an AC output power line of the power conversion apparatus are disconnected from each other.

4. The power conversion apparatus according to claim 1, including a DC-DC converter connecting the DC power sources that supply input voltages to the second and third inverters and the first DC power source to each other.

5. The power conversion apparatus according to claim 1, including a booster circuit boosting output voltage generated by a second DC power source of the plurality of DC power sources to be the output voltage of the first DC power source.

6. The power conversion apparatus according to claim 5, wherein the booster circuit includes a switch so that when the voltage of the second DC power source exceeds a predetermined voltage, switching of the switch in the booster circuit is stopped and boosting by the booster circuit stops.

7. The power conversion apparatus according to claim 6, including a bypass circuit that bypasses the booster circuit and, when voltage output by a second DC power source of the plurality of DC power sources exceeds a predetermined voltage, swithching of the switch in the booster circuit is stopped, boosting by the booster circuit stops, and the booster circuit is bypassed by the bypass circuit.

8. The power conversion apparatus according to claim 7, wherein the bypass circuit includes a relay.

9. The power conversion apparatus according to claim 5, wherein a predetermined AC voltage and AC current is output and supplied to a load.

10. The power conversion apparatus according to claim 5 wherein a predetermined AC voltage and AC current is output and connected in parallel to a system, and a second DC power source of the plurality of DC power sources is linked to the system.

* * * * *